United States Patent
Sudo et al.

(10) Patent No.: US 11,713,432 B2
(45) Date of Patent: *Aug. 1, 2023

(54) AUTOMOTIVE SLIDE MEMBER (71) Applicants: TOYOTA JIDOSHA KABUSHIKI KAISHA, Toyota (JP); KYODO YUSHI CO., LTD., Fujisawa (JP)

(72) Inventors: Junichi Sudo, Miyoshi (JP); Youji Kanehara, Nagoya (JP); Koushi Yamada, Odawara (JP); Kenichiro Sakurai, Toyota (JP); Ko Tanimura, Suzuka (JP); Tomonobu Komoriya, Chigasaki (JP)

(73) Assignees: TOYOTA JIDOSHA KABUSHIKI KAISHA, Toyota (JP); KYODO YUSHI CO., LTD., Fujisawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,856

(22) Filed: Jun. 30, 2021

(65) Prior Publication Data
US 2022/0017834 A1 Jan. 20, 2022

(30) Foreign Application Priority Data
Jul. 20, 2020 (JP) ................................ 2020-123867

(51) Int. Cl.
*C10M 125/02* (2006.01)
*B60N 2/90* (2018.01)
(Continued)

(52) U.S. Cl.
CPC .............. *C10M 125/02* (2013.01); *B60J 7/02* (2013.01); *B60N 2/90* (2018.02); *B62D 1/16* (2013.01);
(Continued)

(58) Field of Classification Search
CPC .......... C10M 125/02; C10M 2201/041; C10M 2203/003; C10M 2213/062; C10M 115/08;
(Continued)

(56) References Cited

U.S. PATENT DOCUMENTS

2002/0072477 A1* 6/2002 Ikejima ................ C10M 169/06
508/552
2005/0229730 A1* 10/2005 Hori ...................... E05F 11/382
74/89

(Continued)

FOREIGN PATENT DOCUMENTS

CN 102105573 A 6/2011
EP 0613939 A2 9/1994
(Continued)

OTHER PUBLICATIONS

Junichi Sudo, U.S. Appl. No. 17/376,684, filed Jul. 15, 2021.
(Continued)

*Primary Examiner* — Ellen M Mcavoy
(74) *Attorney, Agent, or Firm* — Dickinson Wright, PLLC (57) ABSTRACT

The present disclosure relates to an automotive slide member including a first slide portion having a first lubricant applied between first portions of a first friction slide mechanism, and a second slide portion having a second lubricant applied between second portions of a second friction slide mechanism. The first slide portion is arranged at a part to be touched by an operator who attaches the automotive slide member to an automobile or a user of the automobile. The second slide portion is arranged at a part that is not touched by the operator who attaches the automotive slide member to the automobile or the user of the automobile. The second lubricant contains a relatively larger amount of conductive carbon than that of the first lubricant.

18 Claims, 8 Drawing Sheets

(51) Int. Cl.
*B60J 7/02* (2006.01)
*B62D 1/16* (2006.01)
*B62D 5/04* (2006.01)
*C10M 115/08* (2006.01)
*C10M 147/00* (2006.01)
*C10M 161/00* (2006.01)
*C10M 169/00* (2006.01)
*E05F 7/00* (2006.01)
*F16D 65/00* (2006.01)
*C10N 40/04* (2006.01)
*C10N 40/14* (2006.01)
*C10N 50/10* (2006.01)

(52) U.S. Cl.
CPC ......... *B62D 5/0403* (2013.01); *C10M 115/08* (2013.01); *C10M 147/00* (2013.01); *C10M 161/00* (2013.01); *C10M 169/00* (2013.01); *E05F 7/00* (2013.01); *F16D 65/005* (2013.01); *C10M 2201/041* (2013.01); *C10M 2203/003* (2013.01); *C10M 2213/062* (2013.01); *C10M 2215/1026* (2013.01); *C10N 2040/04* (2013.01); *C10N 2040/14* (2013.01); *C10N 2050/10* (2013.01); *E05Y 2800/108* (2013.01); *E05Y 2900/55* (2013.01)

(58) Field of Classification Search
CPC .......... C10M 147/00; C10M 161/00; C10M 169/00; C10M 2215/1026; B60J 7/02; B60N 2/90; B62D 1/16; B62D 5/0403; E05F 7/00; F16D 65/005; E05Y 2800/108; E05Y 2900/55; C10N 2040/04; C10N 2040/14; C10N 2050/10
See application file for complete search history.

(56) References Cited

U.S. PATENT DOCUMENTS

| | | | |
|---|---|---|---|
| 2007/0196632 A1 | 8/2007 | Meyer, Jr. et al. | |
| 2007/0265177 A1* | 11/2007 | Michioka | C10M 169/06 508/391 |
| 2008/0146474 A1 | 6/2008 | Takahashi et al. | |
| 2008/0196995 A1* | 8/2008 | Mikami | F16D 41/06 384/607 |
| 2008/0219610 A1* | 9/2008 | Nakatani | C10M 155/02 508/110 |
| 2010/0234254 A1* | 9/2010 | Koshima | C10M 135/34 544/182 |
| 2011/0046027 A1* | 2/2011 | Zhamu | C10M 103/02 977/734 |
| 2011/0111993 A1 | 5/2011 | Shimura et al. | |
| 2017/0275558 A1 | 9/2017 | Saito et al. | |
| 2017/0362530 A1* | 12/2017 | Hirooka | F16H 57/12 |
| 2018/0057768 A1* | 3/2018 | Sakai | C10M 169/06 |
| 2019/0119595 A1* | 4/2019 | Tanaka | C10M 145/14 |
| 2019/0300813 A1* | 10/2019 | Shishikura | C10M 117/06 |
| 2020/0032157 A1* | 1/2020 | Asai | C10M 169/00 |
| 2021/0348078 A1 | 11/2021 | Haramoto et al. | |
| 2021/0403752 A1* | 12/2021 | Yamasaki | C09D 7/61 |
| 2022/0017837 A1* | 1/2022 | Sudo | F16C 33/102 |
| 2022/0018398 A1 | 1/2022 | Sudo et al. | |

FOREIGN PATENT DOCUMENTS

| | | |
|---|---|---|
| JP | 2004169862 A | 6/2004 |
| JP | 2006-152092 A | 6/2006 |
| JP | 2010-100702 A | 5/2010 |
| JP | 2010-100703 A | 5/2010 |
| JP | 2014-240676 A | 12/2014 |
| JP | 2020-012034 A | 1/2020 |
| JP | 2020117696 A | 8/2020 |
| JP | 2021-195015 A | 12/2021 |
| WO | 2010010789 A1 | 1/2010 |
| WO | 2021/255517 A1 | 12/2021 |

OTHER PUBLICATIONS

Sudo et al., Office Action Issued to U.S. Appl. No. 17/367,697 dated May 27, 2022.

Notice of Allowance issued to U.S. Appl. No. 17/367,697 dated Dec. 7, 2022.

Junichi Sudo et al., Office Action Issued to U.S. Appl. No. 17/376,684 dated Mar. 27, 2023.

* cited by examiner

AUTOMOTIVE SLIDE MEMBER

CROSS-REFERENCE TO RELATED APPLICATION

This application claims priority to Japanese Patent Application No. 2020-123867 filed on Jul. 20, 2020, incorporated herein by reference in its entirety.

BACKGROUND

1. Technical Field

The present disclosure relates to an automotive slide member.

2. Description of Related Art

In general, the body of an automobile is positively charged due to, for example, disturbance and friction caused between each tire and a road during traveling. Radio noise caused when the charged static electricity is discharged may cause malfunction in electronic devices mounted on the automobile. In view of this, a technology is developed to eliminate static electricity via wheel bearings filled with conductive grease.

For example, Japanese Unexamined Patent Application Publication No. 2004-169862 (JP 2004-169862 A) describes an automotive wheel bearing including an outer bearing ring having an outer ring raceway on its inner peripheral surface, an inner bearing ring having an inner ring raceway on its outer peripheral surface, a plurality of rolling elements provided in a rollable manner between the outer ring raceway and the inner ring raceway, and a cage that retains the rolling elements in a rollable manner. A space between the outer ring raceway and the inner ring raceway is filled with a grease composition consisting essentially of a base oil, a thickener containing a metal composite soap or a urea compound, and conductive carbon black having a mean particle diameter of less than 2 μm.

SUMMARY

There are known a lubricant containing a conductive additive such as carbon black for static elimination of an automobile as described above, and a vehicle to which the lubricant is applied. However, the related art has several problems. For example, when conductive carbon such as carbon black is used as the additive of the lubricant, the lubricant is generally black. When this lubricant is applied to a slide member of an automobile at a part to be touched by an operator who attaches the slide member or a user of the automobile, the black lubricant may adhere to the operator, the user, and/or other members of the automobile. When the black lubricant adheres to the operator or the user, workability may decrease. When the black lubricant adheres to the other members of the automobile, the designability of the automobile may decrease.

The present disclosure provides an automotive slide member that can improve static elimination of an automobile whose body is charged during traveling, and/or improve handling stability through the static elimination, and can substantially suppress or avoid a decrease in workability and/or designability due to adhesion of a lubricant.

The inventors have found that static elimination of an automobile and/or handling stability through the static elimination can be improved and a decrease in workability and/or designability due to adhesion of a lubricant can substantially be suppressed or avoided by applying a first lubricant containing substantially no conductive carbon or containing a small amount of conductive carbon to an automotive slide member having a plurality of slide portions at a part to be touched by an operator who attaches the automotive slide member to the automobile or a user of the automobile, and applying a second lubricant containing a relatively larger amount of conductive carbon than that of the first lubricant at a part that is not touched by the operator who attaches the automotive slide member to the automobile or the user of the automobile. The inventors have completed the present disclosure based on the findings.

An aspect of the present disclosure relates to an automotive slide member including:

a first slide portion including a first friction slide mechanism having at least two first portions, and a first lubricant applied between the first portions; and a second slide portion including a second friction slide mechanism having at least two second portions, and a second lubricant applied between the second portions.

The first slide portion is arranged at a part to be touched by an operator who attaches the automotive slide member to an automobile or a user of the automobile.

The second slide portion is arranged at a part that is not touched by the operator who attaches the automotive slide member to the automobile or the user of the automobile.

The first lubricant contains a first base oil and an additive.

The second lubricant contains a second base oil and an additive containing conductive carbon.

The second lubricant contains a relatively larger amount of the conductive carbon than an amount of conductive carbon in the first lubricant.

The first base oil and the second base oil may be identical to or different from each other.

(2) The first lubricant may contain no conductive carbon.

(3) The conductive carbon may be selected from the group consisting of carbon black, carbon nanotube, carbon nanohorn, carbon nanofiber, graphene, and graphite.

(4) The second lubricant may further contain polytetrafluoroethylene as the additive.

(5) Each of the first lubricant and the second lubricant may further contain a thickener, and may be in a form of a grease composition.

(6) The automotive slide member may be an electric power steering system.

(7) The automotive slide member may be a steering column.

(8) The automotive slide member may be a power window regulator.

(9) The automotive slide member may be a brake caliper.

(10) The automotive slide member may be an electric slide roof.

(11) The automotive slide member may be an electric seat.

According to the present disclosure, it is possible to provide the automotive slide member that can improve static elimination of an automobile whose body is charged during traveling, and/or improve handling stability through the static elimination, and can substantially suppress or avoid a decrease in workability and/or designability due to adhesion of a lubricant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Exemplary embodiments of the present disclosure are described below in detail.

1. Automotive Slide Member

The inventors have found that static elimination of an automobile and/or handling stability through the static elimination can be improved and a decrease in workability and/or designability due to adhesion of a lubricant can substantially be suppressed or avoided by applying a first lubricant containing substantially no conductive carbon or containing a small amount of conductive carbon to an automotive slide member having a plurality of slide portions at a part to be touched by an operator who attaches the automotive slide member to the automobile or a user of the automobile, and applying a second lubricant containing a relatively larger amount of conductive carbon than that of the first lubricant at a part that is not touched by the operator who attaches the automotive slide member to the automobile or the user of the automobile. Therefore, one aspect of the present disclosure relates to the automotive slide member.

The automotive slide member of this aspect includes a first slide portion and a second slide portion. The first slide portion includes a first friction slide mechanism having at least two first portions. A first lubricant is applied between the two first portions. The second slide portion includes a second friction slide mechanism having at least two second portions. A second lubricant is applied between the two second portions. The first slide portion and the second slide portion are separate members, and are arranged at different locations. The automotive slide member of this aspect may include another slide portion as appropriate in addition to the first slide portion and the second slide portion. The other slide portion includes a friction slide mechanism having at least two portions. A lubricant is applied between the two portions. The lubricant applied to the other slide portion may be the first lubricant, the second lubricant, or other lubricants. Each of the first portion and the second portion is hereinafter referred to simply as "portion" as well. Each of the first friction slide mechanism and the second friction slide mechanism is hereinafter referred to simply as "friction slide mechanism" as well.

In the automotive slide member of this aspect, the numbers of first slide portions, second slide portions, and other slide portions are not limited, and may independently be set to arbitrary numbers. For example, the automotive slide member may include one first slide portion and one second slide portion, may include one first slide portion, one second slide portion, and one other slide portion, or may include one first slide portion and a plurality of (for example, two to five) second slide portions. In an embodiment in which a plurality of first slide portions, a plurality of second slide portions, and a plurality of other slide portions are provided, the first slide portions may be identical to or different from each other, and the same holds true for the second slide portions and the other slide portions. A plurality of first lubricants applied to the first slide portions may be identical to or different from each other, and the same holds true for a plurality of second lubricants applied to the second slide portions and a plurality of other lubricants applied to the other slide portions.

As described below, the automotive slide member of this aspect only needs to include the first slide portion and the second slide portion in one member handled as a unit. In a case where a plurality of members applied for automotive use includes the first slide portion and the second slide portion, respectively, and the members are handled separately, the automotive slide member of this aspect does not encompass a combination of those members. For example, in a case of an automobile in which a set of a sleeve and a spline that frictionally slide against each other (for example, sleeve and spline of steering shaft) includes the first slide portion and an axle rolling bearing (for example, hub bearing) includes the second slide portion, those members are generally handled separately, and therefore the automotive slide member of this aspect does not encompass a combination of those members.

In the automotive slide member of this aspect, the first lubricant contains a first base oil and an additive, the second lubricant contains a second base oil and an additive containing conductive carbon, and the second lubricant contains a relatively larger amount of conductive carbon than that of the first lubricant.

In other words, the first lubricant contains substantially no conductive carbon or contains a relatively smaller amount of conductive carbon than that of the second lubricant. The automotive slide member of this aspect having the first lubricant and the second lubricant can improve the static elimination of the automobile and/or the handling stability through the static elimination. The first base oil and the second base oil may be identical to or different from each other.

In each aspect of the present disclosure, the reason why the effect of improvement is attained in the static elimination of the automobile and/or the handling stability through the static elimination can be described as follows. Each aspect of the present disclosure is not limited to the following actions and principles. In general, the body of the automobile is positively charged due to, for example, disturbance and friction caused between each tire and a road during traveling. In general, air is positively charged. Therefore, when the automobile is traveling, electrostatic repulsion occurs between the air and the surface of the body, and a repulsive force is generated in an airflow around the surface of the body in a direction in which the airflow goes away from the automobile. In general, each tire of the automobile is also positively charged due to contact with the road. Particularly in recent years, the content of silica for use in the tire increases to meet an increasing demand toward an energy saving tire. There is a strong tendency that the tire containing a large amount of silica is positively charged. As a result of the charge, the automobile cannot attain desired aerodynamic performance and/or traveling performance, thereby leading to a decrease in the handling stability. In the automotive slide member of this aspect, the second lubricant containing the base oil and the additive containing conductive carbon is applied to the second slide portion. With the conductive carbon contained in the second lubricant, the positive charge on the surface of the body and/or the tire may be reduced via the second slide portion. By applying the second lubricant to the second slide portion in the automotive slide member of this aspect, the handling stability of the automobile can be improved through the removal of the charge on the surface of the body and/or the tire of the automobile.

In each aspect of the present disclosure, the effect of removal of the charge on the surface of the body and/or the tire of the automobile can quantitatively be measured in the following method though the measurement method is not limitative. For example, a test vehicle of an automobile to which the automotive slide member of this aspect is applied is prepared, a chronological change in a potential of the surface and/or the tire of the traveling test vehicle is measured by using a non-contact surface potential meter (surface potentials at positive and negative poles can be measured within a range of, for example, 0.1 to 5 kV), and a measurement result is compared to a measurement result of a reference test vehicle.

In each aspect of the present disclosure, the handling stability of the automobile mainly means a stability of maneuverability related to steering in basic maneuverability of the automobile, such as "move", "turn", and "stop". For example, the handling stability of the automobile can be defined based on followability and response of the automobile when a driver of the automobile actively steers the automobile, and course keeping ability of the automobile and convergence against an external factor such as a road shape or a crosswind when the driver of the automobile does not actively steer the automobile. In each aspect of the present disclosure, the handling stability of the automobile can quantitatively be measured in the following method though the measurement method is not limitative. For example, a test vehicle of an automobile to which the automotive slide member of this aspect is applied is prepared, and a response of the test vehicle to handling of the test vehicle is evaluated. With this method, for example, the handling of the test vehicle can be measured based on a steering angle, and the response of behavior of the test vehicle can be measured based on a vehicle yaw angle acceleration. For example, the steering angle can be measured by a steering angle sensor or a controller area network (CAN) data logger mounted on the vehicle. For example, the vehicle yaw angle acceleration can be measured by a gyro sensor.

In each aspect of the present disclosure, the automobile means a vehicle having four, two, or any other number of wheels made of rubber (tires) and a prime mover such as an engine or a motor.

In each aspect of the present disclosure, the "operator who attaches automotive slide member to automobile" or simply the "operator" means not only an operator who attaches the automotive slide member to the automobile during manufacture of the automobile, but also an operator who detaches the automotive slide member from the automobile and/or reattaches the automotive slide member to the automobile during inspection, repair, or maintenance of the automobile. When the operator attaches the automotive slide member to the automobile during manufacture of the automobile and when the operator detaches the automotive slide member from the automobile and/or reattaches the automotive slide member to the automobile during inspection, repair, or maintenance of the automobile, the operator may touch each portion of the automotive slide member, for example, a portion where the lubricant is applied.

In each aspect of the present disclosure, the "user of automobile" or simply the "user" means not only a driver or a passenger of the automobile, but also a person who uses the automobile for an arbitrary purpose. When the user drives and/or uses the automobile and when inspection is made on the automobile, the user may touch each portion of the automotive slide member, for example, the portion where the lubricant is applied.

As described above, the operator or the user may touch each portion of the automotive slide member, for example, the portion where the lubricant is applied. Conductive carbon is black. When the lubricant contains conductive carbon, the lubricant is also black. Therefore, when the operator or the user touches the portion where the lubricant containing conductive carbon is applied, the black lubricant may adhere to the operator, the user, and/or other members of the automobile. When the black lubricant adheres to the operator or the user, workability may decrease. When the black lubricant adheres to the other members of the automobile, the designability of the automobile may decrease.

In the automotive slide member of this aspect, the first slide portion is arranged at a part to be touched by the operator who attaches the automotive slide member to the automobile or the user of the automobile, and the second slide portion is arranged at a part that is not touched by the operator who attaches the automotive slide member to the automobile or the user of the automobile.

As described above, the second lubricant applied between the second portions of the friction slide mechanism of the second slide portion contains conductive carbon as the additive. Therefore, the second lubricant is generally black. Since the second slide portion is arranged at the part that is not touched by the operator or the user in the automotive slide member of this aspect, there is substantially no possibility that the operator or the user touches the second lubricant. The first lubricant applied between the first portions of the friction slide mechanism of the first slide portion contains substantially no conductive carbon or contains a relatively smaller amount of conductive carbon than that of the second lubricant. Therefore, the first lubricant is generally colorless or black relatively paler than the second lubricant. Since the first slide portion is arranged at the part to be touched by the operator or the user in the automotive slide member of this aspect, the operator or the user may touch the first lubricant. Since the first lubricant is generally colorless or black relatively paler than the second lubricant, there is a lower possibility that the first lubricant adheres to the operator, the user, and/or the other members of the automobile to cause the decrease in the workability and/or the designability. Therefore, the automotive slide member of this aspect including the first slide portion and the second slide portion can substantially suppress or avoid the decrease in the workability and/or the designability due to the adhesion of the lubricant.

In the automotive slide member of this aspect, the base oil contained in each of the first lubricant and the second lubricant may be selected as appropriate from among various base oils such as a mineral oil and a synthetic oil generally used in this technical field. The base oils contained in the first lubricant and the second lubricant may be identical to or different from each other. The mineral oil to be contained in each of the first lubricant and the second lubricant may be a paraffinic mineral oil or a naphthenic mineral oil, and is preferably the paraffinic mineral oil. The mineral oil is preferably produced by combining as appropriate one or more types of arbitrary refining method selected from among, for example, vacuum distillation, solvent deasphalting, solvent extraction, hydrocracking, solvent dewaxing, sulfuric acid treatment, clay refining, and hydrogenation refining. For example, the synthetic oil to be contained in each of the first lubricant and the second lubricant may be a hydrocarbon-based synthetic oil such as a poly-α-olefin oil using 1-decene as a starting material or a co-oligomer oil of α-olefin and ethylene, a phenyl ether-based synthetic oil, an ester-based synthetic oil, a polyglycol-based synthetic oil, a silicone oil, or any other publicly known synthetic oil, and is preferably the hydrocarbon-based synthetic oil composed only of carbon and hydrogen atoms.

The base oil may be composed of the mineral oil or the synthetic oil exemplified above, or composed as a mixture of a plurality of mineral oils and/or synthetic oils. The base oil is preferably composed only of the mineral oil. When the base oil is composed only of the mineral oil, costs can be reduced. By containing the base oil described above, desired fluidity can be exhibited when the first lubricant and the second lubricant are applied to the first slide portion and the second slide portion in the automotive slide member of this aspect, respectively.

In the automotive slide member of this aspect, the base oil contained in each of the first lubricant and the second lubricant has a kinematic viscosity within a range of preferably 40 $mm^2/s$ to 200 $mm^2/s$, and more preferably 60 $mm^2/s$ to 100 $mm^2/s$ at 40° C. When the kinematic viscosity of the base oil is less than the lower limit value, a sufficient oil film cannot be formed between the portions of the friction slide mechanism of the first slide portion and/or the second slide portion to which the lubricant is applied. Therefore, slide surfaces of the portions of the friction slide mechanism may be damaged. When the kinematic viscosity of the base oil is more than the upper limit value, the viscous resistance of each of the first lubricant and the second lubricant increases. Therefore, a torque may increase and heat may be generated between the portions of the friction slide mechanism of the first slide portion and/or the second slide portion to which the lubricant is applied. Thus, when the base oil having the kinematic viscosity within the range described above is contained, each of the first lubricant and the second lubricant in the automotive slide member of this aspect can exhibit desired fluidity by forming a sufficient oil film between the portions of the friction slide mechanism of the first slide portion and/or the second slide portion to which the lubricant is applied.

In each aspect of the present disclosure, the kinematic viscosity of the base oil or the like can be measured, for example, in conformity with JIS K 2283 by using a glass capillary viscometer though the measurement method is not limitative.

In the automotive slide member of this aspect, the first lubricant contains substantially no conductive carbon or contains a relatively smaller amount of conductive carbon than that of the second lubricant. The first lubricant preferably contains substantially no conductive carbon. When the first lubricant contains a relatively smaller amount of conductive carbon than that of the second lubricant, the content of conductive carbon falls within a range of preferably 0.1 mass % to 10 mass %, more preferably 0.5 mass % to 8 mass %, and still more preferably 2 mass % to 8 mass % with respect to the total mass of the first lubricant. Alternatively, a lower limit value of the content of conductive carbon in the second lubricant may be set as an upper limit value of the content of conductive carbon in the first lubricant. In this case, the content of conductive carbon in the first lubricant falls within a range of preferably 0.01 mass % to 2 mass %, more preferably 0.01 mass % to 0.5 mass %, and still more preferably 0.01 mass % to 0.1 mass % with respect to the total mass of the first lubricant. Since conductive carbon is black, the first lubricant containing substantially no conductive carbon or containing conductive carbon at any content described above is generally colorless or black relatively paler than the second lubricant. As described above, the first slide portion in the automotive slide member of this aspect is arranged at the part to be touched by the operator or the user. Therefore, the operator or the user may touch the first lubricant. Since the first lubricant is generally colorless or black relatively paler than the second lubricant, there is a lower possibility that the first lubricant adheres to the operator, the user, and/or the other members of the automobile to cause a decrease in the workability and/or the designability. Thus, when the first lubricant contains substantially no conductive carbon or contains conductive carbon at any content described above, the automotive slide member of this aspect can substantially suppress or avoid the decrease in the workability and/or the designability due to the adhesion of the lubricant.

In the automotive slide member of this aspect, the second lubricant contains conductive carbon as the additive, and contains a relatively larger amount of conductive carbon than that of the first lubricant. In the second lubricant, the content of conductive carbon falls within a range of preferably 0.1 mass % to 15 mass %, more preferably 0.5 mass % to 10 mass %, and still more preferably 2 mass % to 8 mass % with respect to the total mass of the second lubricant. When the content of conductive carbon is less than the lower limit value, the conductivity of the second lubricant is insufficient. Therefore, there is a possibility of insufficient removal of charge on the surface of the body and/or the tire of the automobile to which the automotive slide member of this aspect is applied. When the content of conductive carbon is more than the upper limit value, the fluidity of the second lubricant decreases. Therefore, there is a possibility that the second lubricant is not sufficiently distributed between the portions of the friction slide mechanism of the second slide portion to which the second lubricant is applied. Thus, when the second lubricant containing conductive carbon at any content described above is applied between the portions of the friction slide mechanism of the second slide portion, it is possible to improve the handling stability of the automobile to which the automotive slide member of this aspect is applied.

In the automotive slide member of this aspect, when the first lubricant contains conductive carbon, the conductive carbon contained in the first lubricant and the conductive carbon contained in the second lubricant may be identical to or different from each other. The conductive carbon may be selected as appropriate from among various materials generally used as conductive materials. The conductive carbon is preferably at least one material selected from the group consisting of carbon black, carbon nanotube, carbon nanohorn, carbon nanofiber, graphene, and graphite, and more preferably carbon black. The shape of the conductive carbon may be selected as appropriate from among various shapes generally used as the shapes of conductive materials. The primary particle diameter of the conductive carbon falls within a range of preferably 1 nm to 100 nm, and more preferably 5 nm to 50 nm. When each of the first lubricant and the second lubricant, in particular, the second lubricant containing the conductive carbon described above is applied between the portions of the friction slide mechanism of each of the first slide portion and the second slide portion, in particular, the second slide portion, it is possible to improve the handling stability of the automobile to which the automotive slide member of this aspect is applied, and/or substantially suppress or avoid the decrease in the workability and/or the designability due to the adhesion of the lubricant.

In the automotive slide member of this aspect, the first lubricant and/or the second lubricant preferably further contain(s) polytetrafluoroethylene (PTFE) as an additive. When the first lubricant and the second lubricant contain PTFE, the PTFE contained in the first lubricant and the PTFE contained in the second lubricant may be identical to or different from each other. It is known that PTFE is a substance that is likely to be charged negatively. Thus, when the first lubricant and/or the second lubricant, in particular, the second lubricant contain(s) PTFE as the additive in this embodiment, it is possible to neutralize the positive charge on the surface of the body and/or the tire of the automobile to which the lubricant is applied, thereby removing the charge on the surface of the body and/or the tire of the automobile.

In this embodiment, the particle diameter of PTFE is not particularly limited. The mean particle diameter of PTFE in its particle size distribution falls within a range of preferably 0.5 μm to 50 μm, and more preferably 1 μm to 15 μm. The content of PTFE falls within a range of preferably 0.1 mass % to 15 mass %, more preferably 0.5 mass % to 10 mass %, and still more preferably 1 mass % to 8 mass % with respect to the total mass of the first lubricant or the second lubricant. When the content of PTFE is less than the lower limit value, there is a possibility of insufficient removal of charge on the surface and/or the tire of the automobile to which the automotive slide member of this embodiment is applied. When the content of PTFE is more than the upper limit value, the fluidity of the first lubricant and/or the second lubricant decreases. Therefore, there is a possibility that the lubricant is not sufficiently distributed to the first slide portion and/or the second slide portion to which the lubricant is applied. Thus, when the first lubricant and/or the second lubricant containing PTFE having the feature described above are/is applied between the portions of the friction slide mechanism of the first slide portion and/or the second slide portion, in particular, when the second lubricant is applied between the portions of the friction slide mechanism of the second slide portion, it is possible to further improve the handling stability of the automobile to which the automotive slide member of this aspect is applied.

In the automotive slide member of this aspect, the first lubricant and/or the second lubricant may contain one or more types of further additive generally used in this technical field as appropriate. When the first lubricant and the second lubricant contain one or more types of further additive, the one or more types of further additive contained in the first lubricant and the one or more types of further additive contained in the second lubricant may be identical to or different from each other. Examples of the further additive include, but not limited to, a solid additive other than carbon black and PTFE (for example, molybdenum disulfide, graphite, or melamine cyanurate (MCA)), an extreme pressure agent (for example, olefin sulfide, ester sulfide, or sulfides of fats and oils), an anti-wear agent (for example, phosphate ester, acidic phosphate ester, acidic phosphate ester amine salt, zinc dithiophosphate, or zinc dithiocarbamate), an oiliness agent (for example, alcohols, amines, esters, or vegetal and animal fats and oils), an antioxidant (for example, phenolic antioxidant or aminic antioxidant), a rust inhibitor (for example, aliphatic amine salts, zinc naphthanates, or metal sulfonates), and a metal deactivator (for example, benzotriazoles or thiadiazoles). When the first lubricant and/or the second lubricant contain(s) the further additive, the further additive may be composed of any one of the additives exemplified above, or composed as a mixture of a plurality of additives.

In the automotive slide member of this aspect, the first lubricant and/or the second lubricant preferably further contain(s) a thickener. In this embodiment, the first lubricant and/or the second lubricant may be in a form of a solid or semi-solid grease composition. The thickener may be selected as appropriate from among various materials such as a soap material and a non-soap material generally used in this technical field. Examples of the soap material include a lithium soap. Examples of the non-soap material include an organic material such as a diurea compound or fluorine powder, and an inorganic material such as silica powder, titania, alumina, or carbon fiber. In each aspect of the present disclosure, the diurea compound is generally represented by Formula (I):

In Formula (I), $R^1$ and $R^2$ are preferably substituted or unsubstituted $C_6$ to $C_{20}$ alkyls or substituted or unsubstituted $C_6$ to $C_{18}$ aryls independent of each other, more preferably substituted or unsubstituted $C_6$ to $C_{18}$ aryls, and still more preferably substituted or unsubstituted phenyls. Particularly preferably, both $R^1$ and $R^2$ are 4-methylphenyls. In each aspect of the present disclosure, the diurea compound represented by Formula (I) where $R^1$ and $R^2$ are substituted or unsubstituted $C_6$ to $C_{18}$ aryls independent of each other may be referred to as "aromatic diurea compound". In this embodiment, the thickener contained in the first lubricant and/or the second lubricant is preferably the diurea compound, the lithium soap, or a mixture of the diurea compound and the lithium soap, more preferably the diurea compound, and still more preferably the aromatic diurea compound. By containing this thickener, the first lubricant and/or the second lubricant in the automotive slide member of this embodiment can exhibit a high degree of inflow characteristic.

The thickener is preferably contained in the first lubricant and/or the second lubricant in the automotive slide member of this embodiment in such an amount that the worked penetration of the lubricant falls within a range of 220 to 385. More preferably, the worked penetration falls within a range of 265 to 340. The content of the thickener that satisfies those requirements falls within a range of generally 2 mass % to 30 mass %, typically 3 mass % to 25 mass %, and particularly 4 mass % to 20 mass % with respect to the total mass of the first lubricant or the second lubricant. When the content of the thickener is more than the upper limit value, there is a possibility that the first lubricant and/or the second lubricant are/is not sufficiently distributed to the first slide portion and/or the second slide portion to which the first lubricant and/or the second lubricant are/is applied in the automotive slide member of this embodiment. When the content of the thickener is less than the lower limit value, the first lubricant and/or the second lubricant are/is excessively softened in the automotive slide member of this embodiment. Therefore, the first lubricant and/or the second lubricant may leak from the first slide portion and/or the second slide portion. Thus, when the thickener that achieves the worked penetration within the range described above is contained, the first lubricant and/or the second lubricant in the automotive slide member of this embodiment can exhibit desired fluidity without leaking from the first slide portion and/or the second slide portion.

The worked penetration of the first lubricant and/or the second lubricant can be measured, for example, in conformity with JIS K 2220 7.

Figure 1:
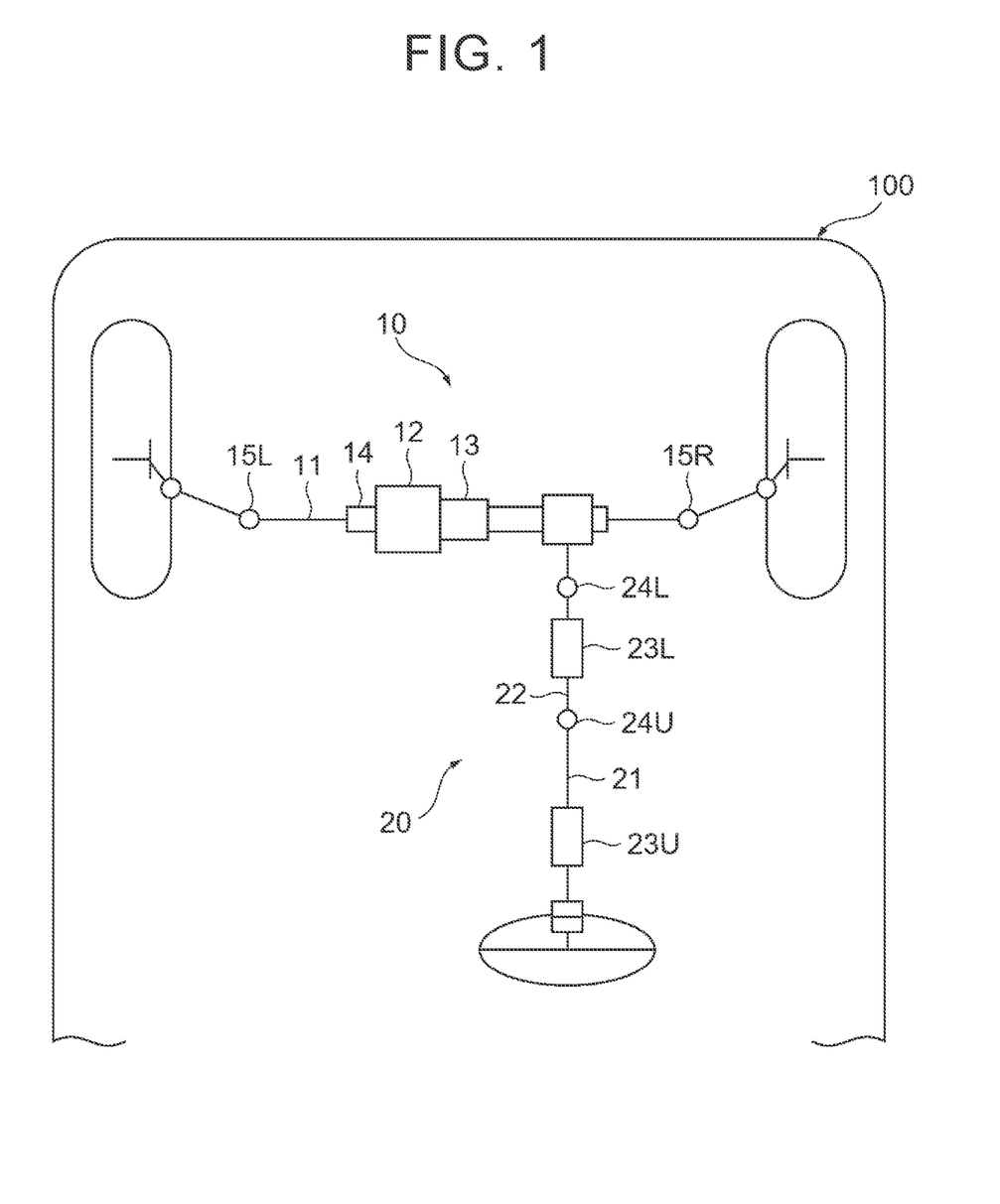
FIG. 1 is a schematic diagram illustrating one embodiment related to an automotive slide member according to one aspect of the present disclosure that is an electric power steering system or a steering column.

The automotive slide member of this aspect can be applied to various members having friction slide mechanisms mounted on an automobile. In one embodiment, the automotive slide member of this aspect is preferably an electric power steering system. FIG. 1 is a schematic diagram illustrating the embodiment related to the automotive slide member of this aspect that is the electric power steering system. As illustrated in FIG. 1, an electric power steering system 10 is mounted on an automobile 100. The electric power steering system 10 includes an intermediate shaft 11, a motor 12, a conversion mechanism 13, a housing 14, and joints 15R and 15L. The conversion mechanism 13 converts a rotational torque of the motor 12 into a force in a reciprocating direction of the intermediate shaft 11. The housing 14 houses the motor 12 and the conversion mechanism 13. The joints 15R and 15L are arranged at both ends of the intermediate shaft 11. The intermediate shaft 11 has a spline connector (not illustrated) including a sleeve and a spline that frictionally slide against each other. The motor 12 and the conversion mechanism 13 have a motor bearing (not illustrated) and a gear box (not illustrated) in the housing 14. Examples of the joints 15R and 15L include Hooke's joints. The electric power steering system 10 drives the intermediate shaft 11 relative to the housing 14 by using the rotational torque of the motor 12 to generate a steering assist force for reducing a steering load on a driver. In the electric power steering system of this embodiment, the numbers of intermediate shafts, motors, conversion mechanisms, joints, spline connectors, motor bearings, and gear boxes and their locations are not limited to those in FIG. 1, and may be arbitrary numbers and locations. In the electric power steering system 10 of this embodiment, the intermediate shaft 11 serves as the first slide portion because the intermediate shaft 11 is arranged at a part to be touched by an operator or a user. The motor 12 and the conversion mechanism 13 serve as the second slide portion because the motor 12 and the conversion mechanism 13 are enclosed in the housing 14 and therefore arranged at parts that are not touched by the operator or the user. The joints 15R and 15L serve as the other slide portions. The first lubricant is applied to meshing portions of spline grooves and spline teeth between the sleeve and the spline of the intermediate shaft 11 serving as the first slide portion. The second lubricant is applied to the motor bearing and the gear box of the motor 12 and the conversion mechanism 13 serving as the second slide portion. The first lubricant, the second lubricant, or any other lubricant may be applied to each of the joints 15R and 15L. By applying the automotive slide member of this aspect that is the electric power steering system, it is possible to improve handling stability of the automobile, and/or substantially suppress or avoid a decrease in workability and/or designability due to adhesion of the lubricant.

Figure 2:
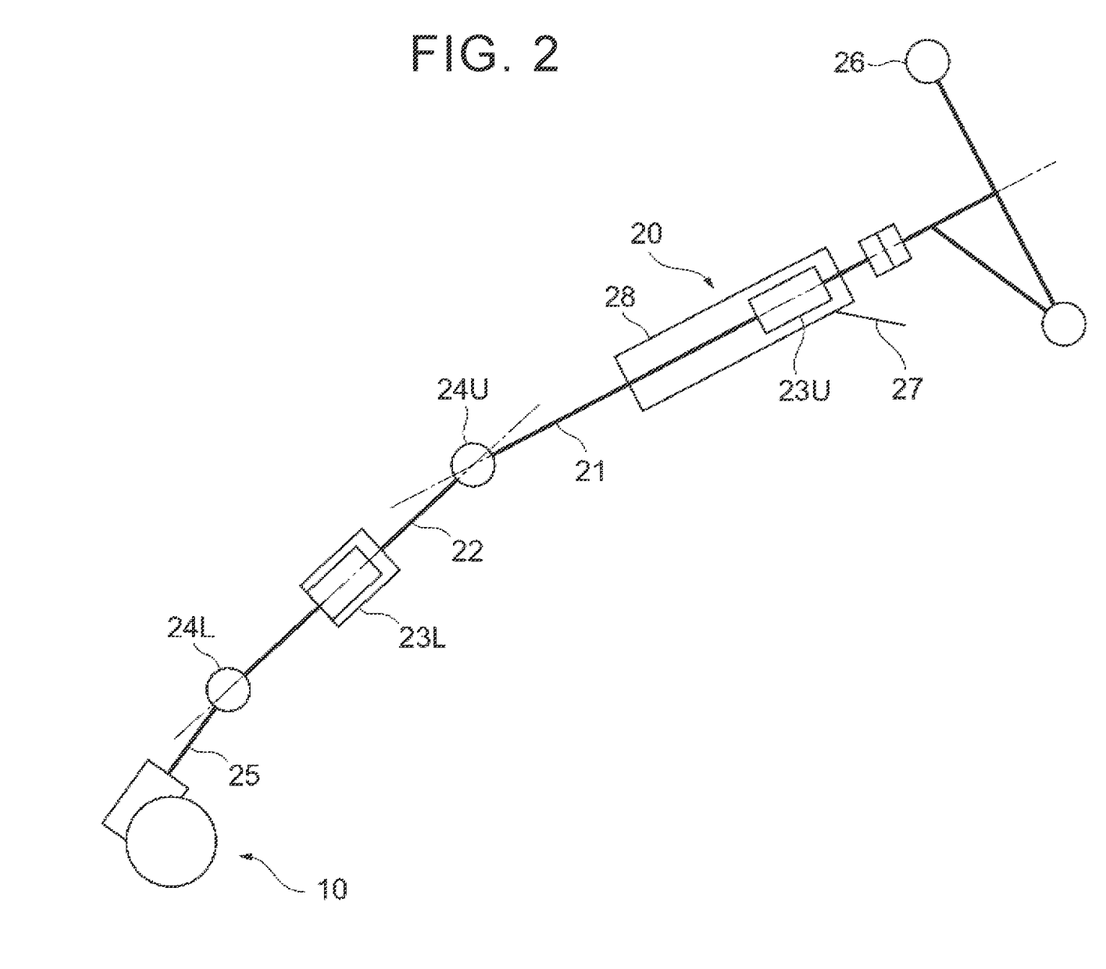
FIG. 2 is a schematic diagram illustrating the embodiment related to the automotive slide member according to the aspect of the present disclosure that is the steering column.

In another embodiment, the automotive slide member of this aspect is preferably a steering column. FIG. 1 and FIG. 2 are schematic diagrams illustrating the embodiment related to the automotive slide member of this aspect that is the steering column. As illustrated in FIG. 1, a steering column 20 is mounted on the automobile 100, and is connected to the electric power steering system 10. As illustrated in FIG. 2, the steering column 20 includes an upper steering shaft 21, a lower steering shaft 22, spline connectors 23U and 23L, a joint 24U, a joint 24L, a steering wheel 26, a tilt-and-telescopic fixing lever 27, and a casing 28. The spline connectors 23U and 23L are arranged on the upper steering shaft 21 and the lower steering shaft 22, and each include a sleeve and a spline that frictionally slide against each other. The joint 24U connects the upper steering shaft 21 and the lower steering shaft 22. The joint 24L connects the lower steering shaft 22 and a pinion shaft 25. The tilt-and-telescopic fixing lever 27 is used for adjusting the position of the steering wheel 26. The casing 28 houses the upper steering shaft 21, the spline connector 23U, and the tilt-and-telescopic fixing lever 27. The upper steering shaft 21 and the lower steering shaft 22 have bearings (not illustrated). Examples of the joints 24U and 24L include constant velocity joints. The steering column 20 is connected to the electric power steering system 10 via the pinion shaft 25. In the steering column of this embodiment, the numbers of upper steering shafts, lower steering shafts, spline connectors, joints, and tilt-and-telescopic fixing levers and their locations are not limited to those in FIG. 2, and may be arbitrary numbers and locations. In the steering column 20 of this embodiment, the spline connectors 23U and 23L and the tilt-and-telescopic fixing lever 27 serve as the first slide portion because the spline connectors 23U and 23L and the tilt-and-telescopic fixing lever 27 are arranged at parts to be touched by the operator or the user and parts where the lubricant is applied are exposed. The bearings of the upper steering shaft 21 and the lower steering shaft 22 and the joints 24U and 24L serve as the second slide portion because they are enclosed and therefore arranged at parts that are not touched by the operator or the user. The first lubricant is applied to meshing portions of spline grooves and spline teeth of the spline connectors 23U and 23L serving as the first slide portion and to an engagement portion of the tilt-and-telescopic fixing lever 27 also serving as the first slide portion. The second lubricant is applied to the bearings of the upper steering shaft 21 and the lower steering shaft 22 and the joints 24U and 24L. By applying the automotive slide member of this aspect that is the steering column, it is possible to improve the handling stability of the automobile, and/or substantially suppress or avoid the decrease in the workability and/or the designability due to the adhesion of the lubricant.

Figure 3:
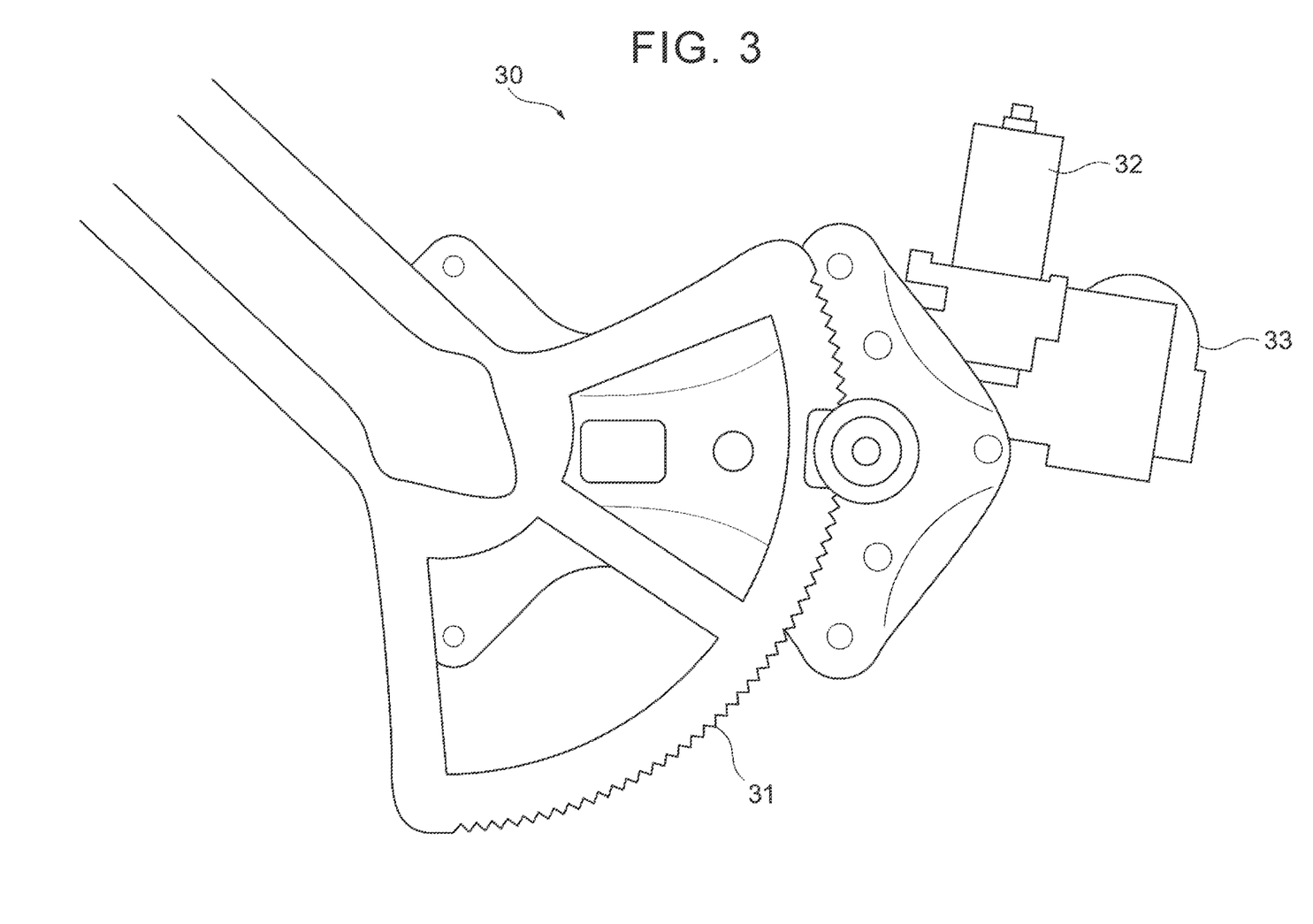
FIG. 3 is a schematic diagram illustrating one embodiment related to an automotive slide member according to one aspect of the present disclosure that is a power window regulator.

In another embodiment, the automotive slide member of this aspect is preferably a power window regulator. FIG. 3 is a schematic diagram illustrating the embodiment related to the automotive slide member of this aspect that is the power window regulator. As illustrated in FIG. 3, a power window regulator 30 includes a regulator gear 31, a motor 32, and a gear box 33 configured to transmit a rotational force of the motor 32 to the regulator gear 31. The motor 32 includes a motor bearing (not illustrated). In the power window regulator of this embodiment, the numbers of regulator gears, motors, and gear boxes and their locations are not limited to those in FIG. 3, and may be arbitrary numbers and locations. In the power window regulator 30 of this embodiment, the regulator gear 31 serves as the first slide portion because the regulator gear 31 is arranged at a part to be touched by the operator or the user and a part where the lubricant is applied is exposed. The motor 32 and the gear box 33 serve as the second slide portion because the motor 32 and the gear box 33 are enclosed and therefore arranged at parts that are not touched by the operator or the user. The first lubricant is applied to a meshing portion of the regulator gear 31 serving as the first slide portion. The second lubricant is applied to the motor bearing of the motor 32 and the gear box 33 serving as the second slide portion. By applying the automotive slide member of this aspect that is the power window regulator, it is possible to improve the handling stability of the automobile, and/or substantially suppress or avoid the decrease in the workability and/or the designability due to the adhesion of the lubricant.

Figure 4:
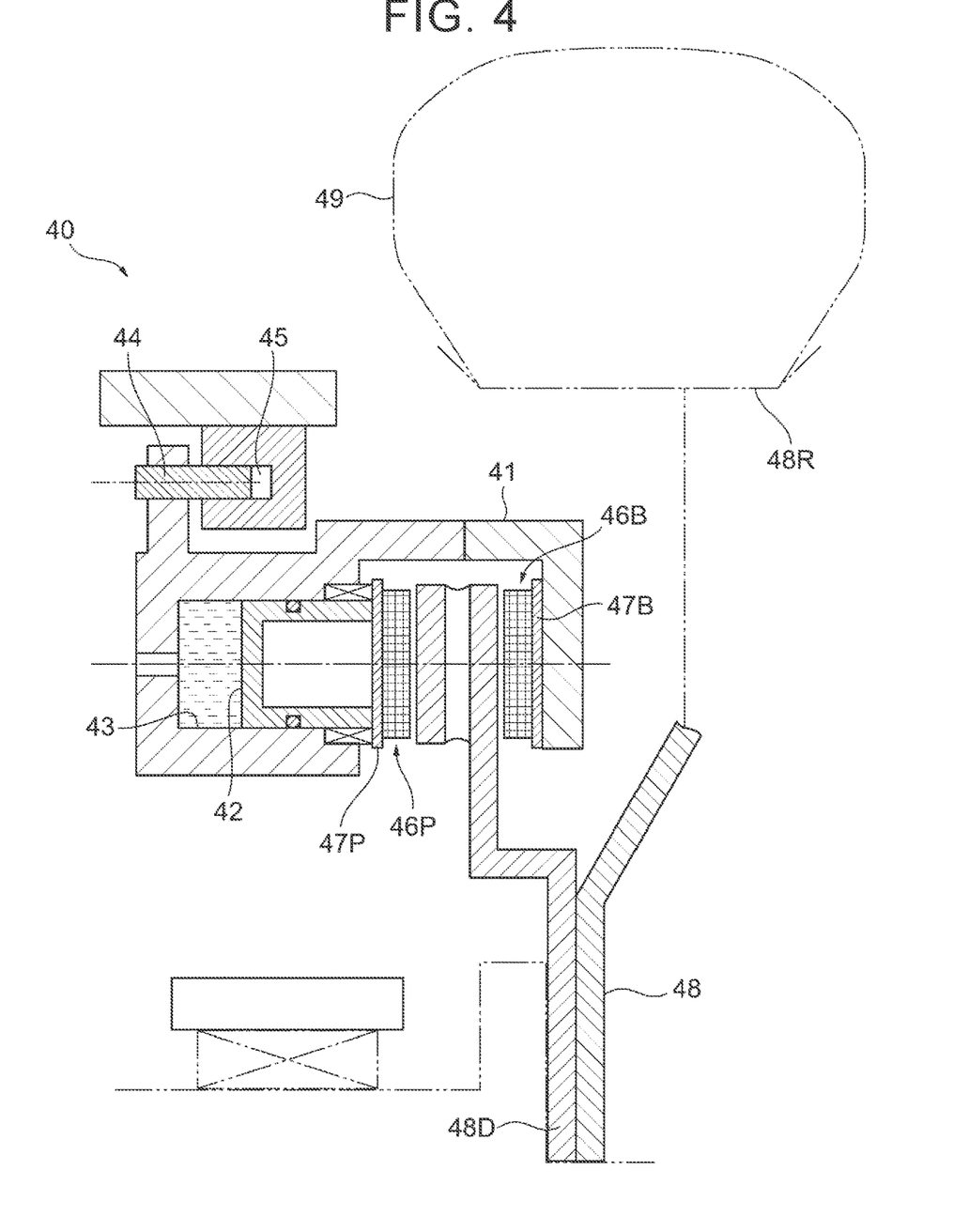
FIG. 4 is a schematic diagram illustrating one embodiment related to an automotive slide member according to one aspect of the present disclosure that is a brake caliper.

In another embodiment, the automotive slide member of this aspect is preferably a brake caliper. FIG. 4 is a schematic diagram illustrating the embodiment related to the automotive slide member of this aspect that is the brake caliper. As illustrated in FIG. 4, a brake caliper 40 includes a caliper base 41, a piston 42, a cylinder bore 43, a slide pin 44, a slide pin hole 45, brake pads 46B and 46P, and metal backing plates 47B and 47P that retain the brake pads 46B and 46P, respectively. Noise reduction shims (not illustrated) may be attached to the backing plates 47B and 47P. The brake caliper 40 is mounted on the automobile together with a tire-wheel assembly including a wheel 48, a brake disc 48D fastened to the wheel 48, a rim 48R arranged on the outer periphery of the wheel 48, and a tire 49 mounted on the rim 48R. High-pressure brake oil is supplied to the cylinder bore 43 from a brake actuator, and the brake pads 46B and 46P are pushed against the brake disc 48D through a reciprocating slide of the piston 42. In the brake caliper of this embodiment, the numbers of pistons, cylinder bores, slide pins, slide pin holes, brake pads, and noise reduction shims and their locations are not limited to those in FIG. 4, and may be arbitrary numbers and locations. In the brake caliper 40 of this embodiment, the brake pads 46B and 46P and the noise reduction shims serve as the first slide portion because the brake pads 46B and 46P and the noise reduction shims are arranged at parts to be touched by the operator or the user and parts where the lubricant is applied are exposed. The piston 42, the cylinder bore 43, the slide pin 44, and the slide pin hole 45 serve as the second slide portion because the piston 42, the cylinder bore 43, the slide pin 44, and the slide pin hole 45 are enclosed and therefore arranged at parts that are not touched by the operator or the user. The first lubricant is applied to the surfaces of the brake pads 46B and 46P and the noise reduction shims serving as the first slide portion. The second lubricant is applied to the friction slide surfaces of the piston 42 and the cylinder bore 43 serving as the second slide portion and to the friction slide surfaces of the slide pin 44 and the slide pin hole 45 also serving as the second slide portion. By applying the automotive slide member of this aspect that is the brake caliper, it is possible to improve the handling stability of the automobile, and/or substantially suppress or avoid the decrease in the workability and/or the designability due to the adhesion of the lubricant.

Figure 5:
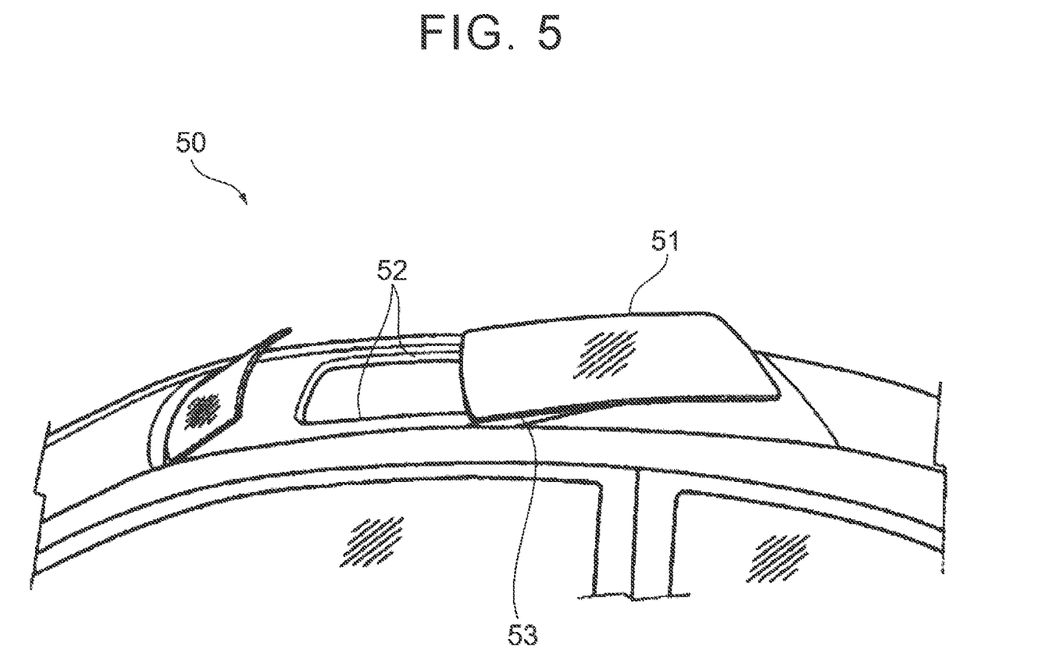
FIG. 5 is a schematic diagram illustrating one embodiment related to an automotive slide member according to one aspect of the present disclosure that is an electric slide roof.

In another embodiment, the automotive slide member of this aspect is preferably an electric slide roof. FIG. 5 is a schematic diagram illustrating the embodiment related to the automotive slide member of this aspect that is the electric slide roof. As illustrated in FIG. 5, an electric slide roof 50 includes a slide panel 51, right and left roof side rails 52, a tilt-up slider 53, and a roof driver (not illustrated). The roof driver includes a motor (not illustrated), a motor bearing (not illustrated), and a gear box (not illustrated). In the electric slide roof of this embodiment, the numbers of slide panels, roof side rails, tilt-up sliders, and roof drivers and their locations are not limited to those in FIG. 5, and may be arbitrary numbers and locations. In the electric slide roof 50 of this embodiment, the roof side rails 52 serve as the first slide portion because the roof side rails 52 are arranged at parts to be touched by the operator or the user and parts where the lubricant is applied are exposed. The tilt-up slider 53 and the roof driver serve as the second slide portion because the tilt-up slider 53 and the roof driver are enclosed and therefore arranged at parts that are not touched by the operator or the user. The first lubricant is applied to the surfaces of the roof side rails 52 serving as the first slide portion. The second lubricant is applied to a meshing portion of the tilt-up slider 53 serving as the second slide portion and to the motor, the motor bearing, and the gear box of the roof driver also serving as the second slide portion. By applying the automotive slide member of this aspect that is the electric slide roof, it is possible to improve the handling stability of the automobile, and/or substantially suppress or avoid the decrease in the workability and/or the designability due to the adhesion of the lubricant.

Figure 6:
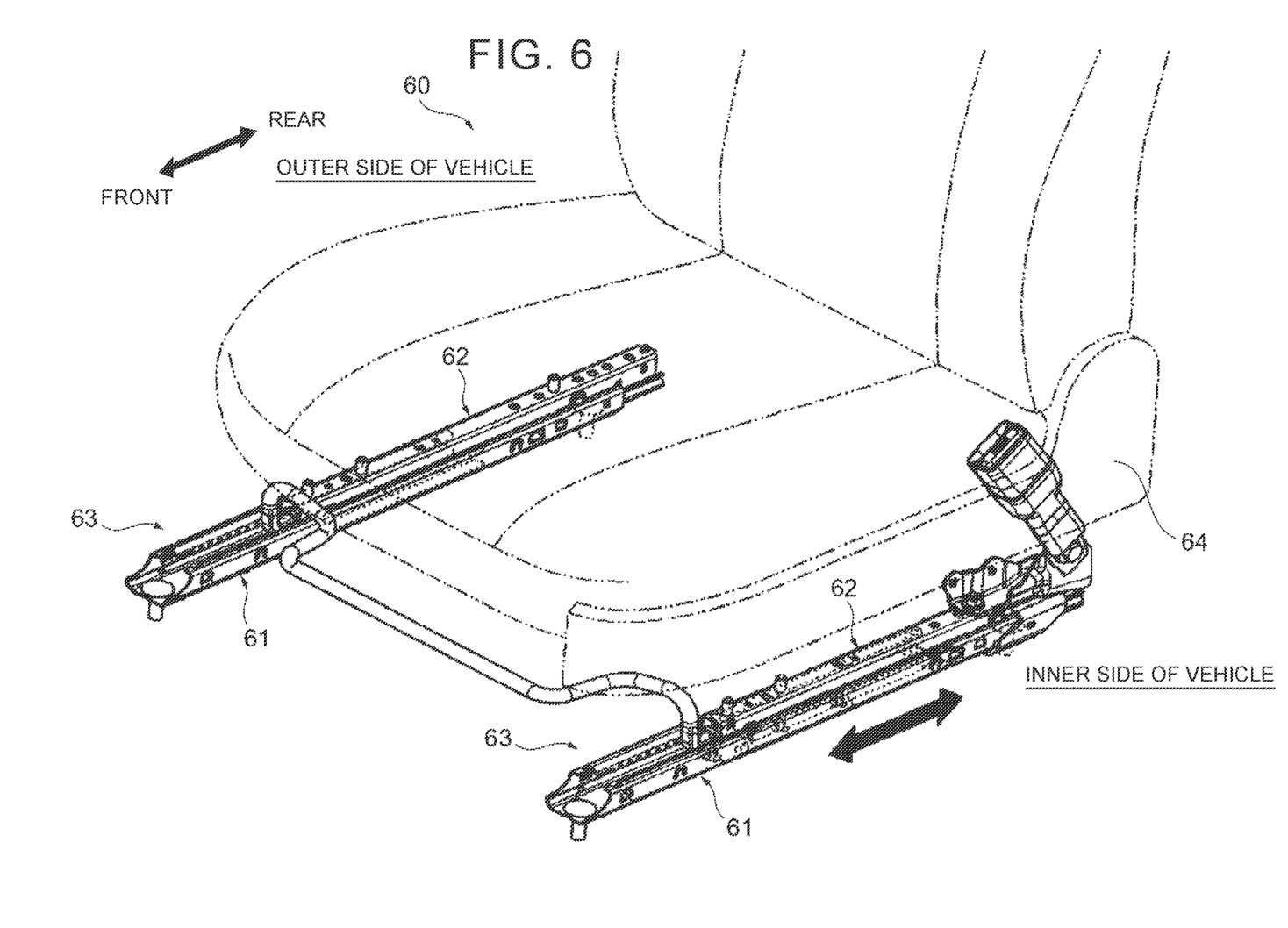
FIG. 6 is a schematic diagram illustrating one embodiment related to an automotive slide member according to one aspect of the present disclosure that is an electric seat.

In another embodiment, the automotive slide member of this aspect is preferably an electric seat. FIG. 6 is a schematic diagram illustrating the embodiment related to the automotive slide member of this aspect that is the electric seat. As illustrated in FIG. 6, an electric seat 60 includes slide rails 63 each including a lower rail 61 and an upper rail 62, and a slide mechanism 64 arranged inside the seat. The slide mechanism 64 includes a motor (not illustrated), a motor bearing (not illustrated), and a gear box (not illustrated). In the electric seat of this embodiment, the numbers of lower rails, upper rails, slide rails, and slide mechanisms and their locations are not limited to those in FIG. 6, and may be arbitrary numbers and locations. In the electric seat 60 of this embodiment, the slide mechanism 64 serves as the first slide portion because the slide mechanism 64 is arranged at a part to be touched by the operator when the seat is assembled and attached to the automobile and a part where the lubricant is applied is exposed. The slide rails 63 each including the lower rail 61 and the upper rail 62 serve as the second slide portion because the slide rails 63 are enclosed and therefore arranged at parts that are not touched by the operator or the user. The first lubricant is applied to the motor, the motor bearing, and the gear box of the slide mechanism 64 serving as the first slide portion. The second lubricant is applied to the friction slide surfaces of the lower rails 61 and the upper rails 62 of the slide rails 63 serving as the second slide portion. By applying the automotive slide member of this aspect that is the electric seat, it is possible to improve the handling stability of the automobile, and/or substantially suppress or avoid the decrease in the workability and/or the designability due to the adhesion of the lubricant.

2. Method for Manufacturing Automotive Slide Member

Another aspect of the present disclosure relates to a method for manufacturing the automotive slide member of the one aspect of the present disclosure. The method of this aspect includes a slide portion preparing step, a slide portion arranging step, a lubricant preparing step, and a lubricant applying step.

In the method of this aspect, the slide portion preparing step includes preparing a first slide portion including a friction slide mechanism having at least two portions, and preparing a second slide portion including a friction slide mechanism having at least two portions. In some cases, this step may include preparing another slide portion including a friction slide mechanism having at least two portions.

In this step, the first slide portion, the second slide portion, and the other slide portion may be prepared by producing those members having predetermined shapes and structures, or may be prepared by, for example, purchasing those members.

In the method of this aspect, the slide portion arranging step includes arranging the first slide portion at a part to be touched by an operator who attaches the automotive slide member to an automobile or a user of the automobile, and arranging the second slide portion at a part that is not touched by the operator who attaches the automotive slide member to the automobile or the user of the automobile. In some cases, this step may include arranging the other slide portion at a desired part.

In the method of this aspect, the lubricant preparing step includes preparing a first lubricant containing a base oil and an additive, and preparing a second lubricant containing a base oil and an additive containing conductive carbon, and containing a relatively larger amount of conductive carbon than that of the first lubricant. In some cases, this step may include preparing another lubricant containing a base oil and an additive.

This step can be carried out by mixing components of each lubricant by using a kneading device generally used in this technical field, such as a roll mill, a Fryma mill, a Charlotte mill, or a homogenizer. In this step, the order of mixing of various components is not particularly limited. For example, the components may be mixed by simultaneously adding an additive, and in some cases, a thickener to a base oil, or by separately adding the additive and the thickener (for example, sequentially or with a predetermined time interval).

In the method of this aspect, the lubricant applying step includes applying the first lubricant between the at least two portions of the friction slide mechanism of the first slide portion, and applying the second lubricant between the at least two portions of the friction slide mechanism of the second slide portion. In some cases, this step may include applying the other lubricant between the at least two portions of the friction slide mechanism of the other slide portion.

3. Method for Improving Handling Stability of Automobile

Another aspect of the present disclosure relates to a method for improving handling stability of an automobile. The method of this aspect includes a step of applying a first lubricant between at least two portions of a friction slide mechanism of a first slide portion arranged at a part to be touched by an operator who attaches an automotive slide member to the automobile or a user of the automobile, and a step of applying a second lubricant between at least two portions of a friction slide mechanism of a second slide portion arranged at a part that is not touched by the operator who attaches the automotive slide member to the automobile or the user of the automobile. In some cases, the method of this aspect may include a step of applying another lubricant between at least two portions of a friction slide mechanism of another slide portion arranged at a desired part. The first lubricant, the second lubricant, and in some cases, the other lubricant applied in the method of this aspect are the lubricants described above.

By carrying out the method of this aspect, it is possible to improve the handling stability of the automobile while substantially suppressing or avoiding a decrease in workability and/or designability due to adhesion of the lubricant.

The present disclosure is described below in more detail by way of examples. However, the technical scope of the present disclosure is not limited to those examples.

I: Preparation of Lubricants

A thickener (aromatic diurea compound; product of reaction between 4,4'-diphenylmethane diisocyanate and p-toluidine), carbon black (primary particle diameter: 10 to 20 nm), polytetrafluoroethylene (PTFE; mean particle diameter in particle size distribution: 5 μm), and other additives (antioxidant, rust inhibitor, and anti-wear agent) were added to a base oil (paraffinic mineral oil; kinematic viscosity: 75 mm$^2$/s (40° C.)), and the components were kneaded by using a triple roll mill. Thus, lubricants of Example 1 and Comparative Example 1 were prepared in the form of a grease composition. The structure of the aromatic diurea compound is shown below. Table 1 shows contents of the components of the lubricants of Example 1 and Comparative Example 1. In Table 1, the contents of the components are expressed in units of mass % with respect to the total mass of each lubricant.

TABLE 1

| | | Example 1 | Comparative Example 1 |
|---|---|---|---|
| | Base oil | Balance | Balance |
| | Thickener | 4 | 20 |
| Additive | Carbon black | 5.0 | 0 |
| | PTFE | 5.0 | 0 |
| | Others | 1.8 | 1.8 |

II: Evaluation of Performance of Lubricants

Worked Penetration Measurement Test

Worked penetrations of the lubricants of Example 1 and Comparative Example 1 were measured in conformity with JIS K 2220 7. As a result, the worked penetrations of the lubricants of Example 1 and Comparative Example 1 were 300 each.

Handling Stability Measurement Test

Axle rolling bearings (manufactured by JTEKT Corporation; hub units having multi-row angular contact ball bearings) were filled with each of the lubricants of Example 1 and Comparative Example 1. The axle rolling bearings were attached to four tire-wheel assemblies on the front, rear, right, and left of a test vehicle. Table 2 shows specifications of the test vehicle.

TABLE 2

| Example/Comparative Example | Vehicle | Model | L/O | Outline of specifications | Hub-unit bearing | Tire |
|---|---|---|---|---|---|---|
| Example 1 | RX450h | GYL25W-AWXGB(L) | '16/8 | 3.5L-HV Xe-4WD | Lubricant of Example 1 | Standard 235/55/R20 |
| Comparative Example 1 | | | | | Lubricant of Comparative Example 1 | |

Figure 7:
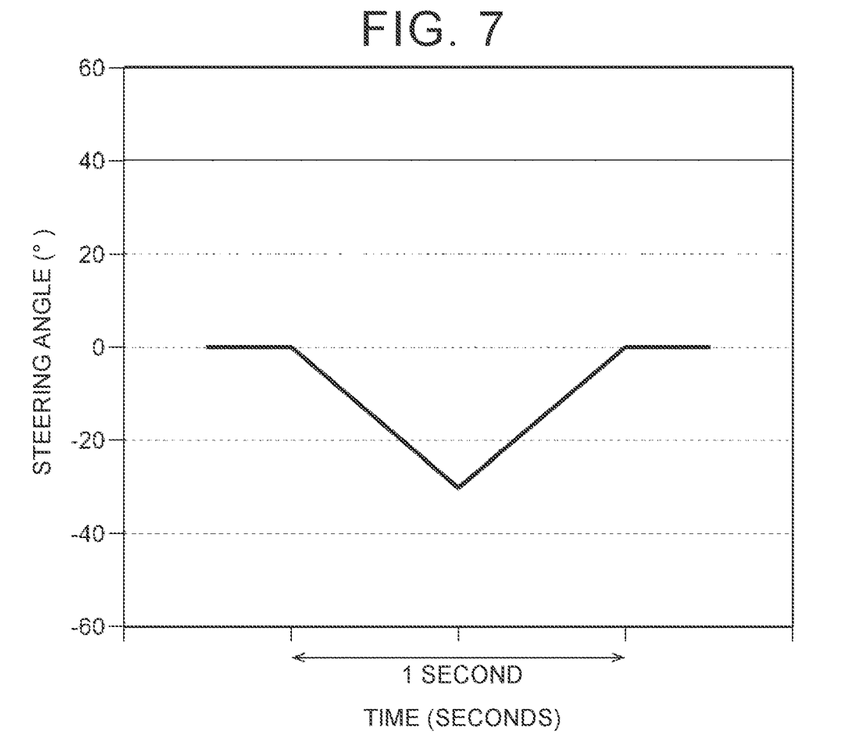
FIG. 7 is a graph chronologically illustrating a steering angle when changing lanes in a handling stability measurement test.

The test vehicles of Example 1 and Comparative Example 1 traveled at a speed of 70 km/h. During the traveling, lanes were repeatedly changed in a steering manner during lane changing illustrated in FIG. 7. In the steering manner illustrated in FIG. 7, a change in a steering angle of "0°→−30°→0°" was made in one second (the change in the steering angle is hereinafter referred to also as "steering angle of 60°/sec"). In the traveling test, steering angles and vehicle yaw angle accelerations of the test vehicles of Example 1 and Comparative Example 1 were measured. The steering angle was measured by using a steering angle sensor and a CAN data logger mounted on the vehicle. The vehicle yaw angle acceleration was measured by using a gyro sensor (NAV440CA-200 manufactured by CROSSBOW).

Figure 8:
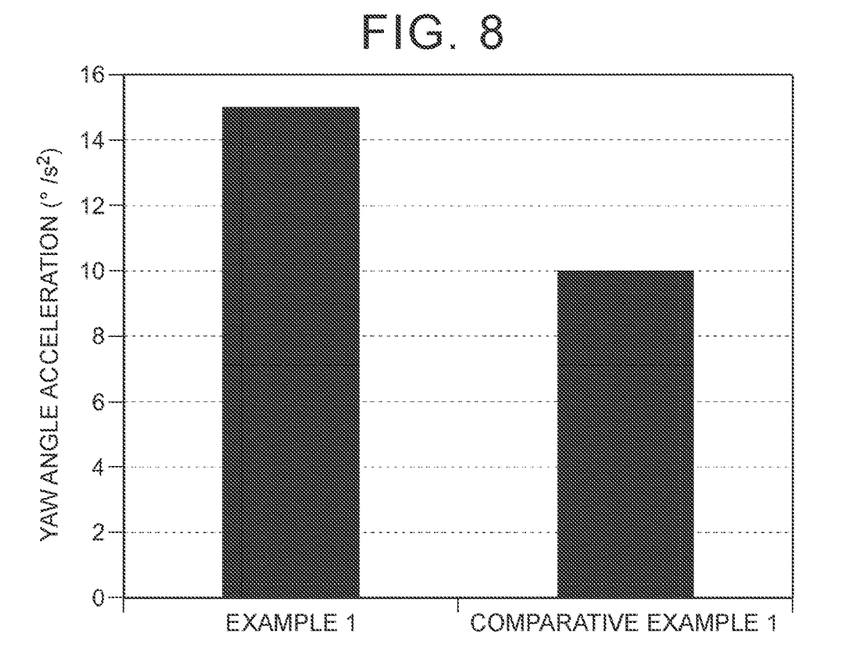
FIG. 8 is a graph illustrating values of vehicle yaw angle accelerations at a steering angle of 60°/sec in test vehicles of Example 1 and Comparative Example 1.

To quantitatively measure the handling stabilities of the test vehicles, responses of the test vehicles to the handling of the test vehicles were evaluated. In this test, the handling of each test vehicle was measured based on the steering angle, and the response of behavior of the test vehicle was measured based on the vehicle yaw angle acceleration. FIG. 8 illustrates values of the vehicle yaw angle accelerations at the steering angle of 60°/sec in the test vehicles of Example 1 and Comparative Example 1.

As illustrated in FIG. 8, the value of the vehicle yaw angle acceleration of the test vehicle of Example 1 was remarkably higher than the value of the vehicle yaw angle acceleration of the test vehicle of Comparative Example 1. This result demonstrates that the response of the test vehicle to the steering of the test vehicle was improved by using the lubricant of Example 1, and accordingly the handling stability of the test vehicle was improved.

Measurement Test for Effect of Charge Removal from Vehicle Body

A lubricant of Example 2 was prepared under conditions similar to the above except for such changes in the lubricant of Example 1 that the content of the thickener was 3 mass %, the content of carbon black was 5 mass %, the content of PTFE was 10 mass %, the content of the other additives was 1.8 mass %, and the balance was the content of the base oil. A test vehicle was prepared under conditions similar to the above by using the lubricant of Example 2.

Figure 9A:
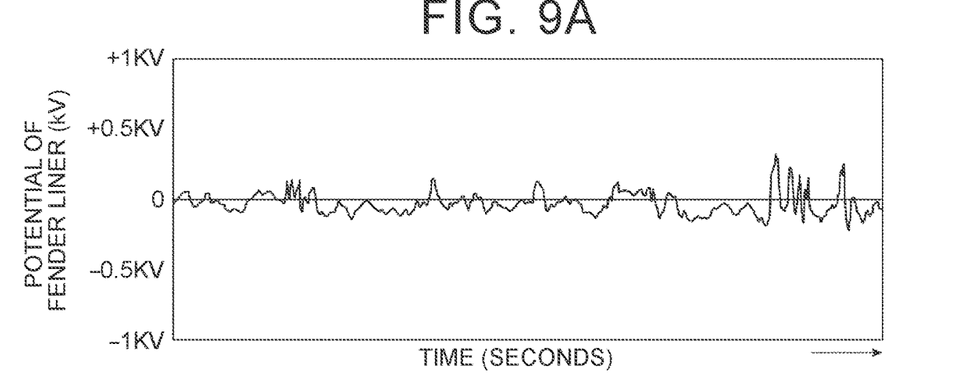
FIG. 9A is a graph illustrating a chronological change in a potential of a fender liner in the traveling test vehicle of Comparative Example 1.
Figure 9B:
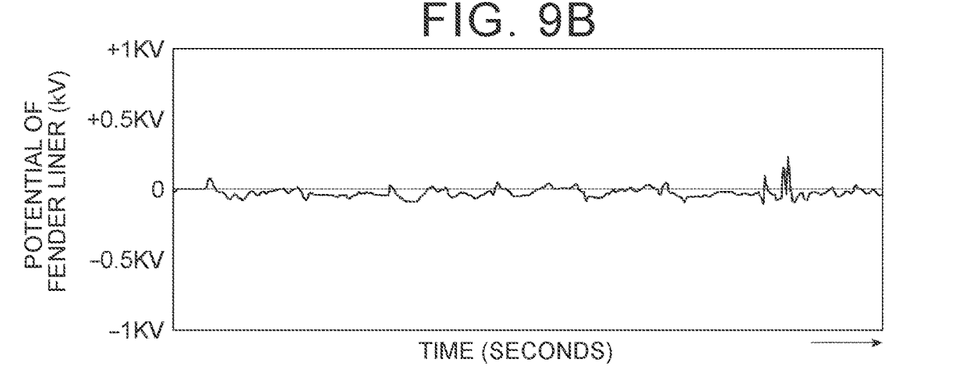
FIG. 9B is a graph illustrating a chronological change in a potential of a fender liner in a traveling test vehicle of Example 2.

The test vehicles of Example 2 and Comparative Example 1 traveled at a speed of about 100 km/h from the start. During the traveling, a potential of a tire tread at a rear part of a left rear tire-wheel assembly and a potential of a fender liner (component facing the tire tread) were measured by using a non-contact surface potential meter (surface potentials at positive and negative poles can be measured within a range of 0.1 to 5 kV). FIG. 9A and FIG. 9B illustrate chronological changes in the potentials of the fender liners. FIG. 9A illustrates a measurement result of the test vehicle of Comparative Example 1. FIG. 9B illustrates a measurement result of the test vehicle of Example 2. In FIG. 9A and FIG. 9B, the horizontal axis represents an elapsed time (seconds), and the vertical axis represents a potential (kV).

In the case of the test vehicle of Comparative Example 1 illustrated in FIG. 9A, the potential changed within a range of +0.34 to −0.24 kV. In the case of the test vehicle of Example 2 illustrated in FIG. 9B, the potential changed within a range of +0.09 to −0.12 kV. Those results demonstrate that a positive potential of a vehicle body and/or a charge on the tire were/was removed by using the lubricant of Example 2, and the change in the charged potential of the vehicle body of the traveling vehicle was reduced to about ⅓.

Measurement Test for Voltage Drop Times in Lubricants

Figure 10:
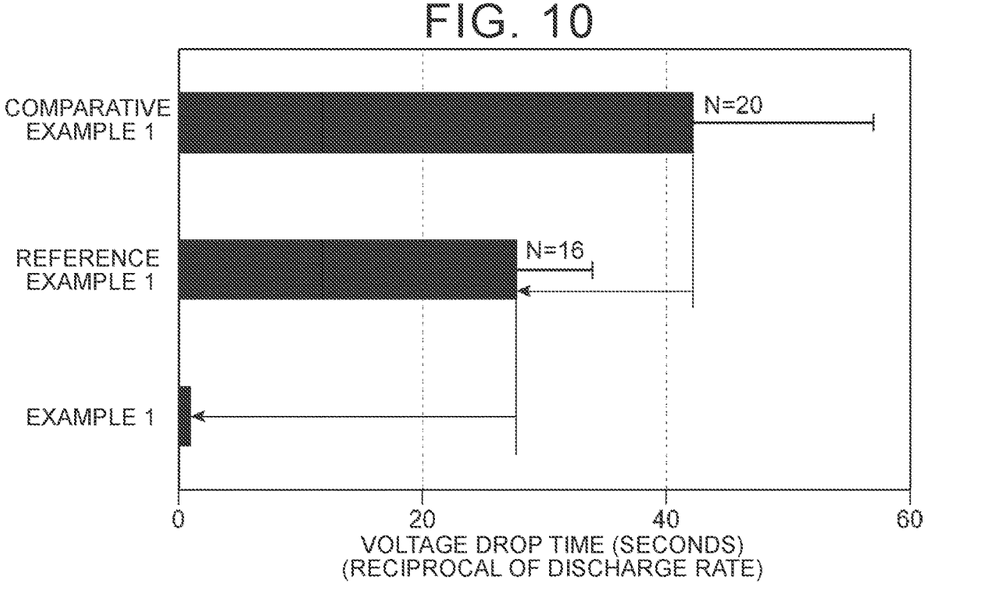
FIG. 10 is a graph illustrating a voltage drop time (reciprocal of discharge rate) serving as an index of a discharge rate measured by using a discharge characteristic evaluation device in each of lubricants of Example 1, Reference Example 1, and Comparative Example 1.

A lubricant of Reference Example 1 was prepared under conditions similar to the above except for such changes in the lubricant of Example 1 that the content of the thickener was 19 mass %, the content of PTFE was 5 mass %, the content of the other additives was 1.8 mass %, and the balance was the content of the base oil. A test was conducted to measure a voltage drop time serving as an index of a discharge rate by using a discharge characteristic evaluation device in each of the lubricants of Example 1, Reference Example 1, and Comparative Example 1. Each lubricant was placed between a pair of electrodes and forcibly charged (positively) in a non-contact manner from one electrode surface, and the amount of charge (electrostatic voltage) was measured in a non-contact manner. A time required until the electrostatic voltage dropped to 0.2 kV or less was measured, and the measured value was set as the voltage drop time. FIG. 10 is a graph illustrating the voltage drop time (reciprocal of discharge rate) serving as the index of the discharge rate measured by using the discharge characteristic evaluation device in each of the lubricants of Example 1, Reference Example 1, and Comparative Example 1.

In the case of the lubricant of Comparative Example 1 (PTFE and carbon black were not added) illustrated in FIG. 10, an average voltage drop time was 42.2 seconds. In the case of the lubricant of Reference Example 1 (PTFE was added), an average voltage drop time was 27.6 seconds. This result demonstrates that the charge was neutralized by using the lubricant of Reference Example 1. In the case of the lubricant of Example 1 (PTFE and carbon black were added), an average voltage drop time was 1.0 second or less. This result demonstrates that the charge was further neutralized by using the lubricant of Example 1.

What is claimed is:

1. An automotive slide member comprising:
a first slide portion including a first friction slide mechanism having at least two first portions, and a first lubricant applied between the first portions; and
a second slide portion including a second friction slide mechanism having at least two second portions, and a second lubricant applied between the second portions, wherein:
the first slide portion is arranged at a part to be touched by an operator who attaches the automotive slide member to an automobile or a user of the automobile;
the second slide portion is arranged at a part that is not touched by the operator who attaches the automotive slide member to the automobile or the user of the automobile;

the first lubricant contains a first base oil and an additive;
the second lubricant contains a second base oil and an additive containing conductive carbon; and
the second lubricant contains a relatively larger amount of the conductive carbon than an amount of conductive carbon in the first lubricant.

2. The automotive slide member according to claim 1, wherein the first lubricant contains no conductive carbon.

3. The automotive slide member according to claim 1, wherein a content of the conductive carbon in the first lubricant is 0.01 mass % to 2 mass % with respect to a total mass of the first lubricant.

4. The automotive slide member according to claim 3, wherein the content of the conductive carbon in the first lubricant is 0.01 mass % to 0.5 mass % with respect to the total mass of the first lubricant.

5. The automotive slide member according to claim 4, wherein the content of the conductive carbon in the first lubricant is 0.01 mass % to 0.1 mass % with respect to the total mass of the first lubricant.

6. The automotive slide member according to claim 1, wherein a content of the conductive carbon in the second lubricant falls within a range of 0.1 mass % to 15 mass % with respect to a total mass of the second lubricant.

7. The automotive slide member according to claim 6, wherein the content of the conductive carbon in the second lubricant falls within a range of 0.5 mass % to 10 mass % with respect to the total mass of the second lubricant.

8. The automotive slide member according to claim 7, wherein the content of the conductive carbon in the second lubricant falls within a range of 2 mass % to 8 mass % with respect to the total mass of the second lubricant.

9. The automotive slide member according to claim 1, wherein the conductive carbon is selected from the group consisting of carbon black, carbon nanotube, carbon nanohorn, carbon nanofiber, graphene, and graphite.

10. The automotive slide member according to claim 1, wherein the second lubricant further contains polytetrafluoroethylene as the additive.

11. The automotive slide member according to claim 1, wherein each of the first lubricant and the second lubricant further contains a thickener, and is in a form of a grease composition.

12. The automotive slide member according to claim 1, wherein the automotive slide member is an electric power steering system.

13. The automotive slide member according to claim 1, wherein the automotive slide member is a steering column.

14. The automotive slide member according to claim 1, wherein the automotive slide member is a power window regulator.

15. The automotive slide member according to claim 1, wherein the automotive slide member is a brake caliper.

16. The automotive slide member according to claim 1, wherein the automotive slide member is an electric slide roof.

17. The automotive slide member according to claim 1, wherein the automotive slide member is an electric seat.

18. The automotive slide member according to claim 1, wherein the first slide portion and the second slide portion are provided in one member handled as a unit.

* * * * *